(12) United States Patent
Okada

(10) Patent No.: US 10,924,617 B2
(45) Date of Patent: Feb. 16, 2021

(54) IMAGE FORMING SYSTEM, PORTABLE TERMINAL, AND ERROR NOTIFICATION METHOD

(71) Applicant: CANON KABUSHIKI KAISHA, Tokyo (JP)

(72) Inventor: Hideyuki Okada, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/398,551

(22) Filed: Apr. 30, 2019

(65) Prior Publication Data

US 2019/0364162 A1 Nov. 28, 2019

(30) Foreign Application Priority Data

May 22, 2018 (JP) .............................. JP2018-098060

(51) Int. Cl.
*H04N 1/32* (2006.01)
*H04N 1/00* (2006.01)

(52) U.S. Cl.
CPC ....... *H04N 1/00477* (2013.01); *H04N 1/3263* (2013.01); *H04N 1/32635* (2013.01); *H04N 1/32667* (2013.01)

(58) Field of Classification Search
USPC ....... 358/1.1–3.29, 1.1–1.18, 504; 399/8–38; 714/100–4.4, 6.31, 16, 26, 38.1–39, 48, 714/49, 699–707, 748–768, 798, 799; 719/317–321, 328, 329; 715/736–741, 715/808, 809, 975–978
See application file for complete search history.

(56) References Cited

U.S. PATENT DOCUMENTS

| 8,775,878 B2 * | 7/2014 | Nishiyama | G06F 11/0733 714/57 |
| 2003/0184798 A1 * | 10/2003 | Enomoto | H04N 1/32667 358/1.15 |
| 2007/0229877 A1 * | 10/2007 | Shima | G03G 15/55 358/1.14 |

(Continued)

FOREIGN PATENT DOCUMENTS

| JP | 11265270 A | 9/1999 | |
| JP | 2012-029228 | * 2/2012 | ............... H04N 1/00 |

(Continued)

*Primary Examiner* — Marcellus J Augustin
(74) *Attorney, Agent, or Firm* — Venable LLP

(57) ABSTRACT

An image forming system including an image forming apparatus and portable terminals is provided. The image forming apparatus comprises a unit that detects an error as a cause of an interrupt of image formation and transmits an error occurrence notification to each terminal, and a unit that, upon receiving a recovery operation start notification from a terminal and determining that a recovery operation for the error is started, transmits the recovery operation start notification to each terminal. Each terminal comprises a user interface that, upon receiving the error occurrence notification, displays an error notification screen, transmits the recovery operation start notification to the image forming apparatus in accordance with an operation by a user, and upon receiving the recovery operation start notification from the image forming apparatus, displays a recovery operation start screen on the user interface unit.

3 Claims, 16 Drawing Sheets

(56) References Cited

U.S. PATENT DOCUMENTS

| | | | | |
|---|---|---|---|---|
| 2007/0291306 | A1* | 12/2007 | Fujino | G03G 15/55 358/1.15 |
| 2012/0093526 | A1* | 4/2012 | Yasui | G03G 15/502 399/21 |
| 2012/0251133 | A1* | 10/2012 | Shindo | G03G 15/502 399/21 |
| 2016/0371039 | A1* | 12/2016 | Mizuno | G06F 3/1259 |

FOREIGN PATENT DOCUMENTS

| | | |
|---|---|---|
| JP | 2012029228 A | 2/2012 |
| JP | 2017076173 A | 4/2017 |

* cited by examiner

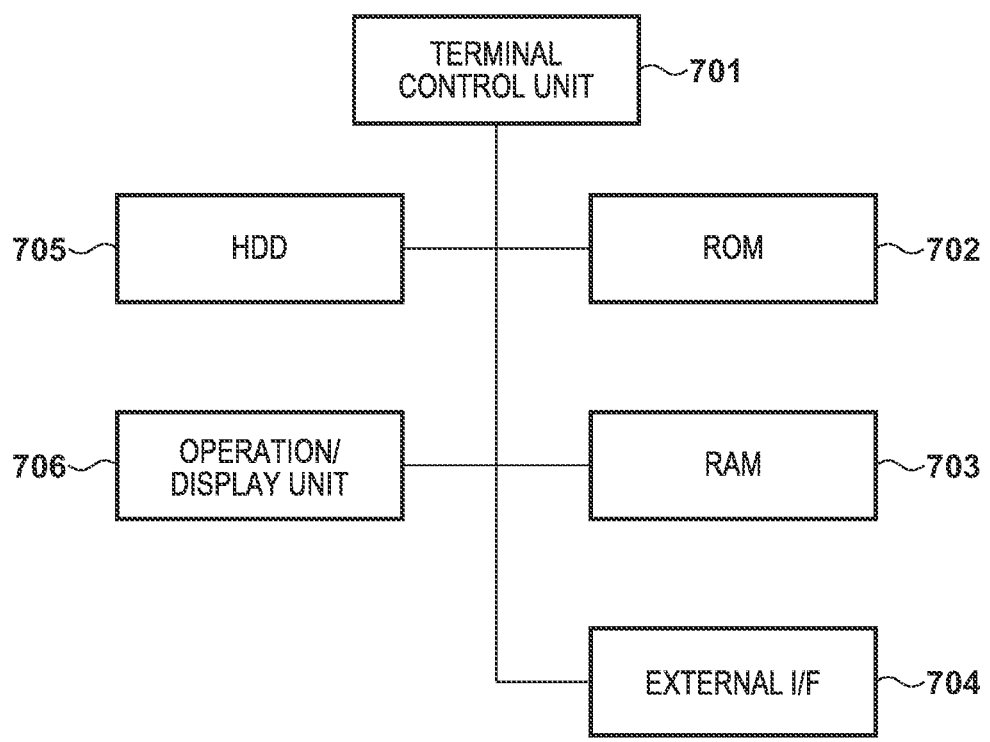

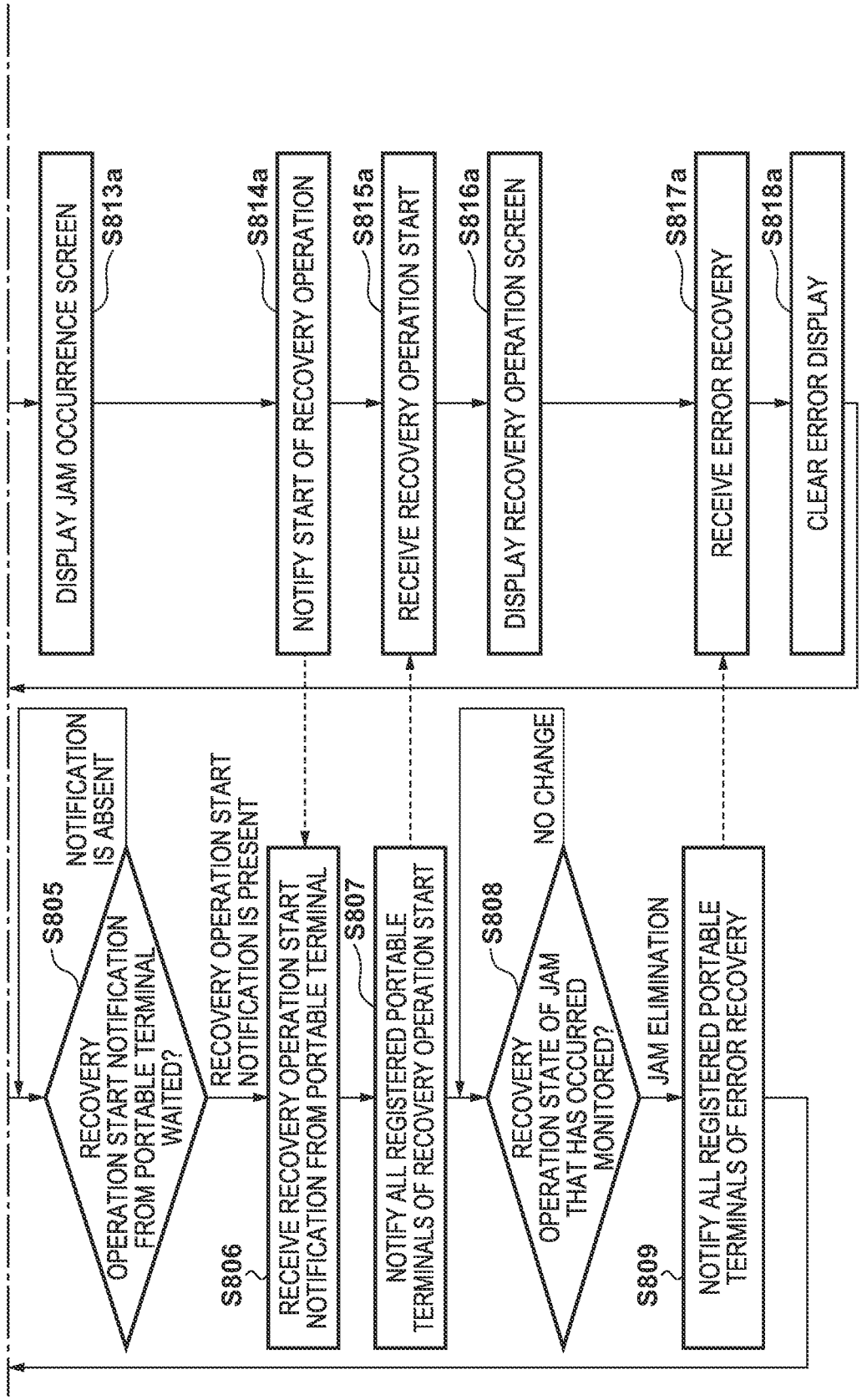

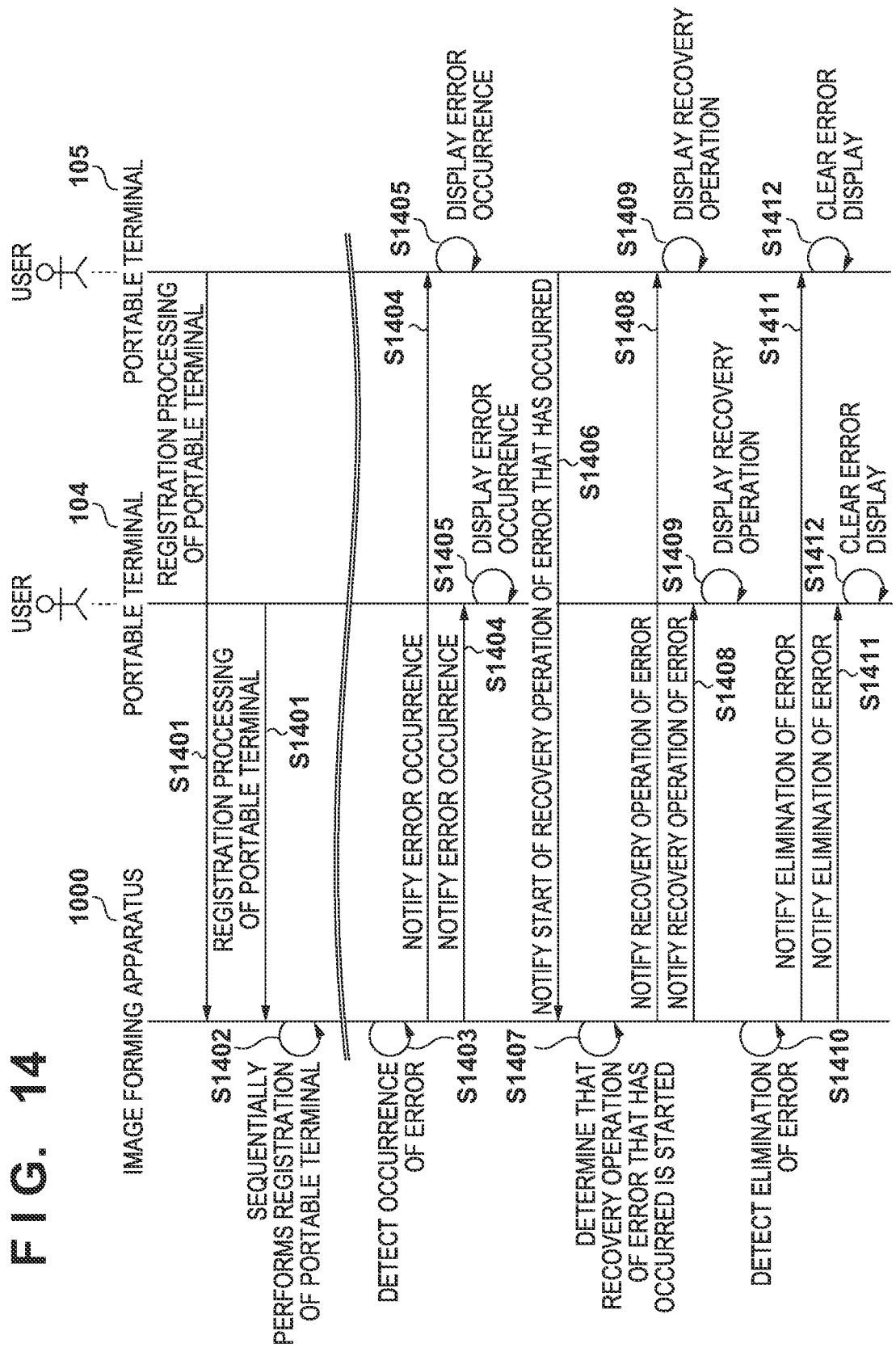

IMAGE FORMING SYSTEM, PORTABLE TERMINAL, AND ERROR NOTIFICATION METHOD

BACKGROUND OF THE INVENTION

Field of the Invention

The present invention relates to an image forming system having a function of notifying, for example, a portable terminal of an error that has occurred in an image forming apparatus, a portable terminal, and an error notification method.

Description of the Related Art

There is proposed a method of, in a case in which an error state such as a paper shortage or a shortage of a color material such as a toner has occurred in an image forming apparatus, reporting the occurrence of the error state to, for example, a wireless terminal (portable terminal) carried by a user and further making a notification to the user using a vibration function or a sound function provided in the portable terminal. For example, Japanese Patent Laid-Open No. 11-265270 proposes a method of notifying the user of a wireless terminal, before a print paper shortage, that a paper shortage will occur soon, thereby allowing the user to replenish print sheets at an optimum timing. In addition, Japanese Patent Laid-Open No. 2017-76173 proposes a method of, if an error has occurred in an image forming apparatus, notifying a portable terminal held by a user having a skill to eliminate the error of the error state, thereby promoting the user to eliminate the error.

However, even if the notification of the error state is received, the user cannot know the state of handling of the notified error state. For this reason, if the user assumes that someone will do a recovery operation, a situation in which no one begins the recovery operation may occur. In addition, if a plurality of persons start the recovery operation, the operations may conflict. Furthermore, in a case in which a member who should do the recovery operation is determined in advance in the operation or the like, or a member is particularly requested to do the recovery operation, if the member overlooks the notification or request, a situation in which the recovery operation is not performed occurs, and it is impossible to immediately notice this situation.

SUMMARY OF THE INVENTION

The present invention provides an image forming system in which an image forming apparatus notifies a user of a handling state for an error, a portable terminal, and an error notification method.

According to the first aspect of the present invention, there is provided an image forming system including an image forming apparatus and a plurality of portable terminals, wherein the image forming apparatus comprises: a unit configured to detect an error as a cause of an interrupt of image formation of an image forming unit and transmit an error occurrence notification to each of the plurality of portable terminals; and a unit configured to, upon receiving a recovery operation start notification from one of the plurality of portable terminals and determining that a recovery operation for the error is started, transmit the recovery operation start notification to each of the plurality of portable terminals, and each of the plurality of portable terminals comprises a user interface unit, upon receiving the error occurrence notification, displays an error notification screen on the user interface unit, transmits the recovery operation start notification to the image forming apparatus in accordance with an operation by a user, and upon receiving the recovery operation start notification from the image forming apparatus, displays a recovery operation start screen on the user interface unit.

According to the second aspect of the present invention, there is provided a portable terminal that forms an image forming system together with an image forming apparatus, comprising: a user interface unit; and a communication unit, wherein upon receiving, from the image forming apparatus, an error occurrence notification concerning an error as a cause of an interrupt of image formation of an image forming unit, an error notification screen is displayed on the user interface unit, a recovery operation start notification is transmitted to the image forming apparatus in accordance with an operation by a user, and upon receiving the recovery operation start notification from the image forming apparatus, a recovery operation start screen is displayed on the user interface unit.

According to the present invention, it is possible to notify a user of a handling state for an error. This makes it possible to reliably and efficiently handle an error.

Further features of the present invention will become apparent from the following description of exemplary embodiments with reference to the attached drawings.

BRIEF DESCRIPTION OF THE DRAWINGS

FIG. 7 is a block diagram of a portable terminal;
FIGS. 8A and 8B are flowcharts according to the first embodiment;
FIG. 14 is a sequence chart showing the outline of the first embodiment.

DESCRIPTION OF THE EMBODIMENTS

First Embodiment

Figure 1:
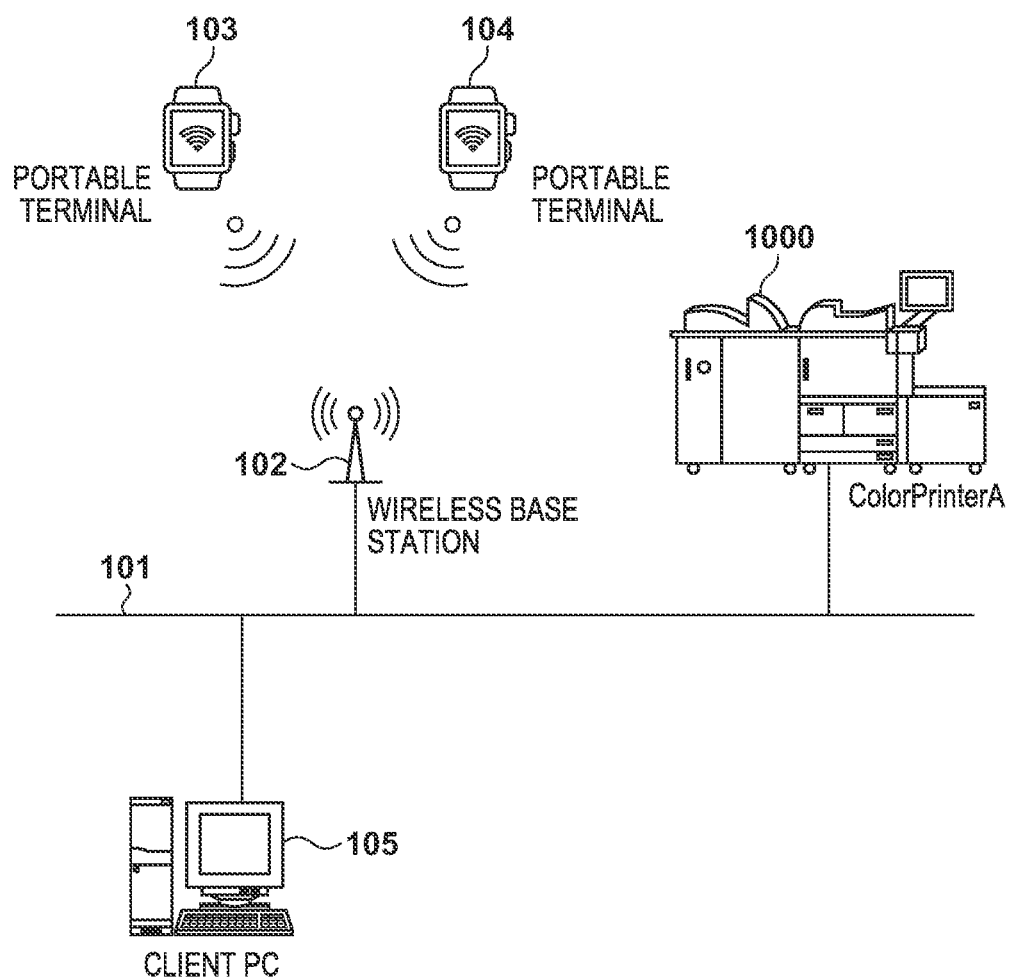
FIG. 1 is a view of a system configuration.

An embodiment of the present invention will now be described with reference to the accompanying drawings. FIG. 1 is a view showing the simple configuration of an image forming system according to this embodiment. The image forming system includes an image forming apparatus 1000, a client PC 105 (to be referred to as the PC 105 hereinafter), and portable terminals (to be also referred to as terminals or terminal devices hereinafter) 103 and 104.

These are connected by a wired network 101 and wireless connection via a base station 102 of wireless communication. The PC 105 transmits PDL (Page Description Language) code data to the image forming apparatus 1000 via the network 101. The image forming apparatus 1000 is, for example, a multi-function copying machine or a digital multi-function peripheral. Each of the portable terminals 103 and 104 and the client PC 105 also functions as a terminal device that transmits jobs and other pieces of information to the image forming apparatus 1000 or receives a message or the like representing a state.

Image Forming Apparatus 1000

Figure 2:
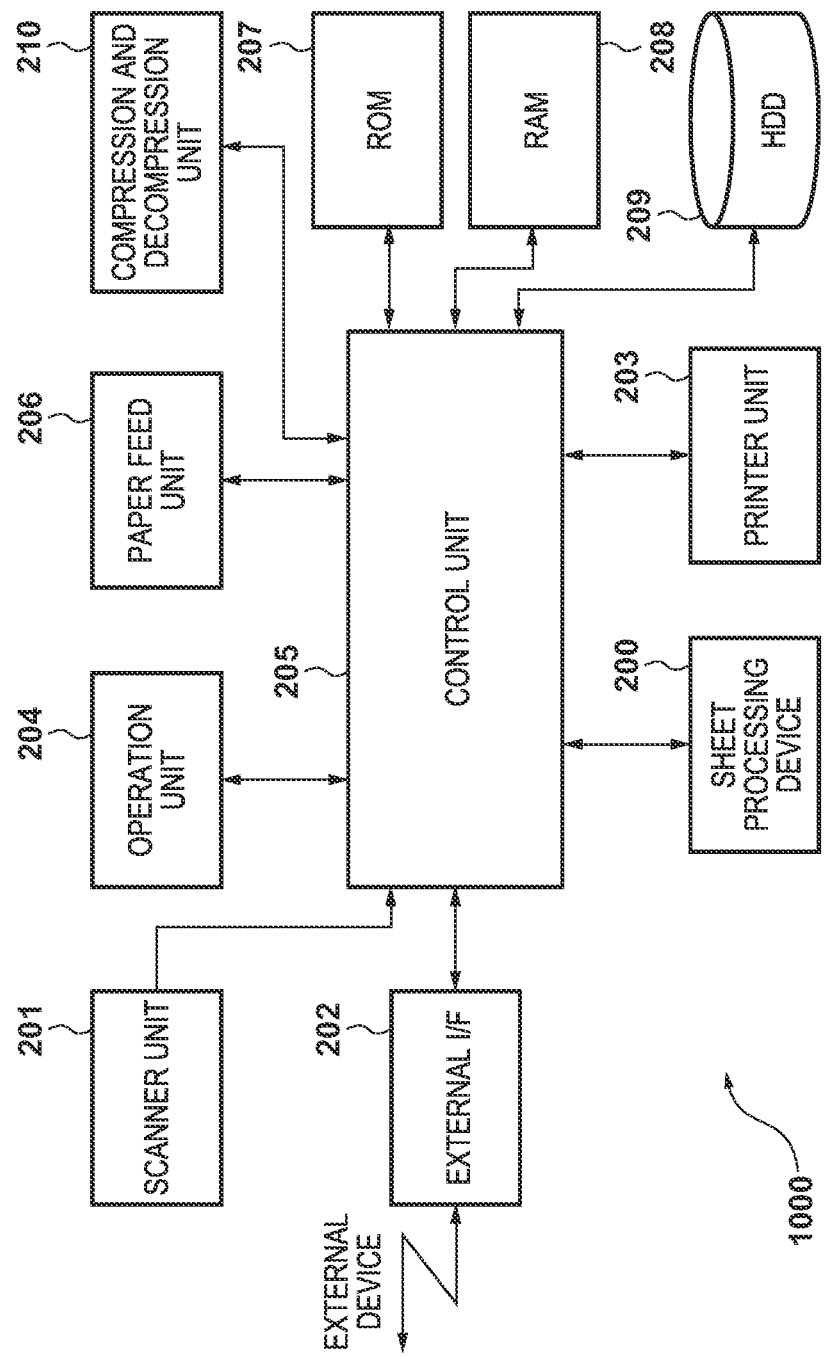
FIG. 2 is a block diagram of an image forming apparatus.
Figure 4:
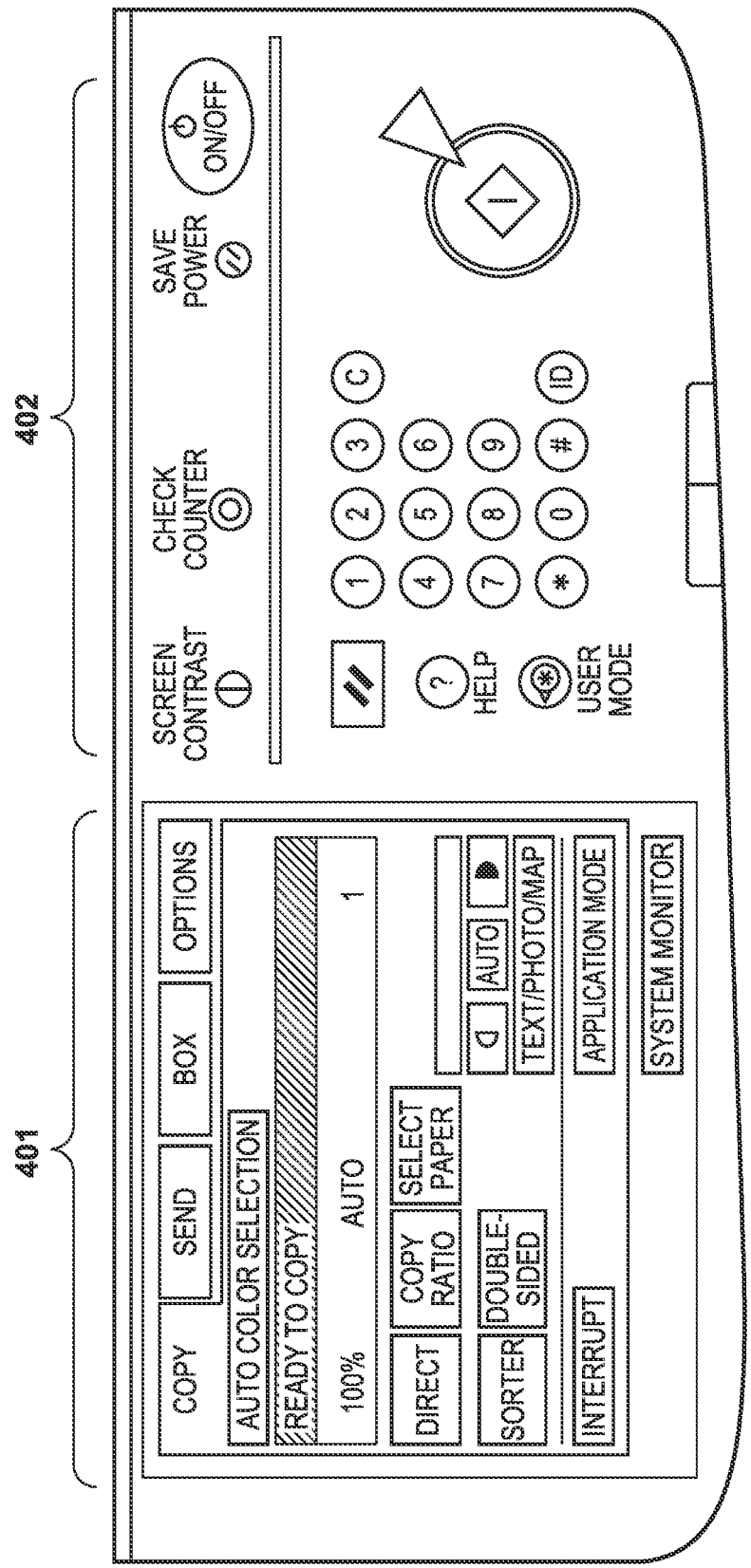
FIG. 4 is a view of an example of an operation unit 204 provided in the image forming apparatus.

The image forming apparatus 1000 will be described next with reference to the block diagram of FIG. 2. A scanner unit 201 reads an image on an original, converts it into image data, and transfers the image data to another unit. An external I/F 202 transmits/receives data to/from another device connected to the network 101. For example, both of the above-described portable terminals 103 and 104 are configured to be able to perform communication via the external I/F 202. A printer unit 203 performs processing of actually printing an image based on input image data on a sheet. An operation unit 204 has a structure as shown in FIG. 4, includes a hard key input unit (key input unit) 402 and a touch panel unit 401, and receives an instruction from an operator via these units. In addition, the operation unit 204 is configured to be able to do various kinds of display on the touch panel unit 401.

Additionally, the image forming apparatus 1000 includes a sheet processing device 200 that executes sheet processing for a printed sheet. The sheet processing device 200 is, for example, a stack tray on which printed sheets are stacked, or a post-processing device capable of executing sheet processing to be described later.

A control unit 205 generally controls the processes and operations of various kinds of units included in the image forming apparatus 1000, including the operation of the sheet processing device 200. The control unit 205 includes, for example, a CPU (processor) and executes programs stored in a ROM 207 or the like, thereby controlling the image forming apparatus 1000. The programs include, for example, the programs of procedures shown in FIGS. 8A, 9, 11, and 12.

The ROM 207 stores various kinds of programs to be executed by the control unit 205. For example, the ROM 207 stores programs configured to cause the control unit 205 to execute various kinds of processing of flowcharts to be described later, and a display control program necessary for displaying various kinds of setting screens. In addition, the ROM 207 stores a program used by the control unit 205 to execute an operation of interpreting PDL code data received from the PC 105 and rasterizing it into raster image data. Also, the ROM 207 stores a boot sequence, font information, and the like. A RAM 208 stores image data and PDL code data sent from the scanner unit 201 and the external I/F 202, various kinds of programs loaded from the ROM 207, and setting information concerning various kinds of functions and print control methods of the image forming apparatus 1000. The control unit 205 is configured to be able to use the pieces of setting information stored in the RAM 208 for control. An HDD (Hard Disk Drive) 209 is formed by a hard disk and a driving unit configured to read/write data from/to the hard disk. The HDD 209 is a mass storage device configured to mainly store image data input from the scanner unit 201 and compressed by a compression and decompression unit 210. The control unit 205 can print image data stored in the HDD 209 by the printer unit 203 based on an instruction of the user. The compression and decompression unit 210 performs compression and decompression operations for image data and the like stored in the RAM 208 and the HDD 209 using various kinds of compression methods such as JBIG and JPEG. In place of the HDD 209, a large-capacity read only memory capable of erase and rewrite may be used.

Figure 3:
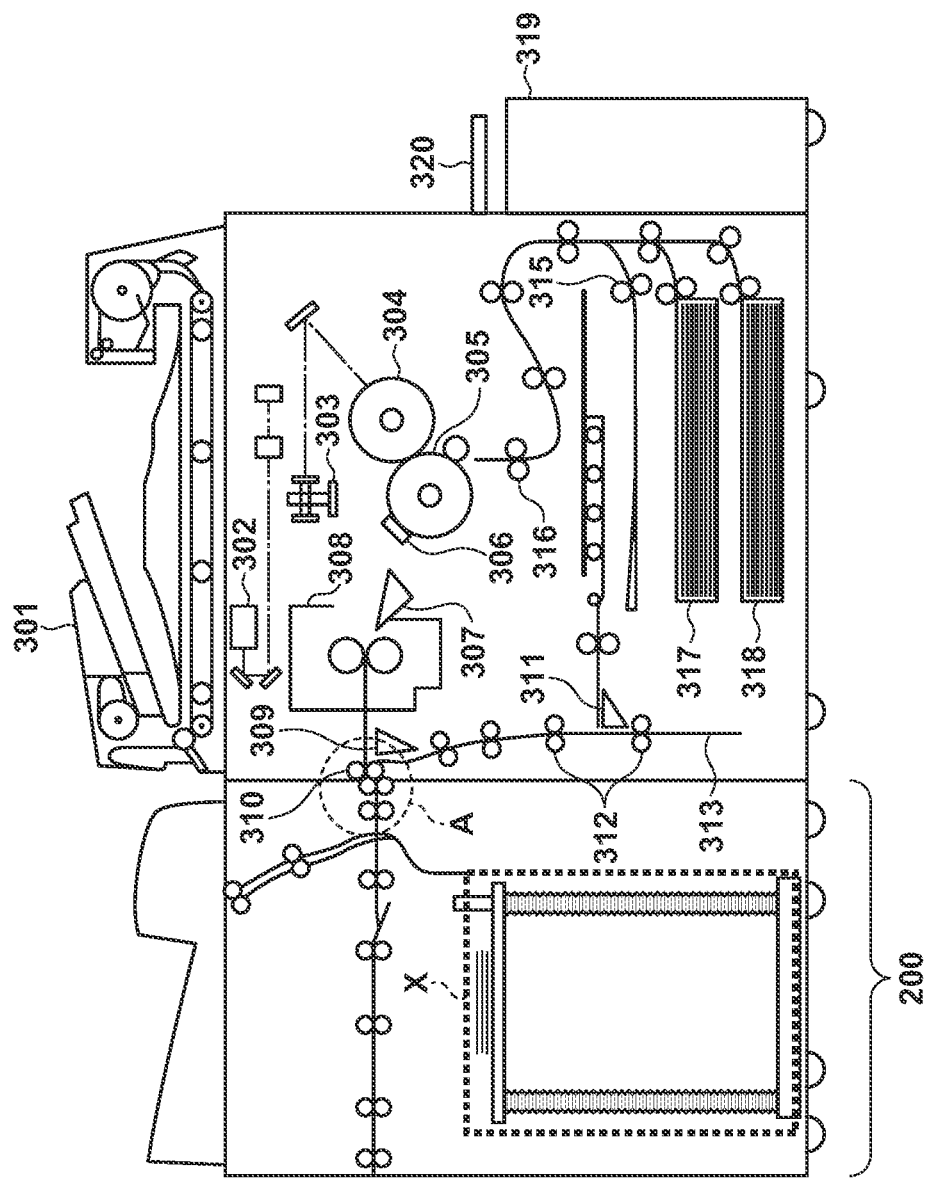
FIG. 3 is a sectional view of the image forming apparatus.

The arrangement of the image forming apparatus 1000 will be described next with reference to FIG. 3. FIG. 3 is a sectional view of the image forming apparatus 1000 and the sheet processing device 200 connected to the image forming apparatus 1000. FIG. 3 shows an arrangement in which a large capacity stacker that performs mass stacking processing of sheets is connected as the sheet processing device.

Referring to FIG. 3, an automatic document feeder (ADF) 301 separates an original page of an original bundle set on the stack surface of an original tray in a page order sequentially from the first page and conveys the original onto an original platen glass to perform original scanning by the scanner 302. The scanner 302 reads the image of the original conveyed onto the original platen glass and converts it into image data by a CCD. A rotating polygon mirror 303 causes, for example, a laser beam modulated based on the image data to enter, and irradiates a photosensitive drum 304 with reflected scanning light via a reflecting mirror. A latent image formed on the photosensitive drum 304 by the laser beam is developed by a toner, and the toner image is transferred to a sheet material attracted to a transfer drum 305. The series of image formation processes is sequentially executed for yellow (Y), magenta (M), cyan (C), and black (K) toners, thereby forming a full color image. After the four image formation processes, the sheet material on the transfer drum 305, on which the full color image is formed, is separated by a separation gripper 306, and conveyed to a fixing unit 308 by a pre-fixing conveyor 307. The fixing unit 308 is formed by combining rollers and belts, incorporates a heat source such as a halogen heater, and melts and fixes, by heat and a pressure, the toners on the sheet material to which the toner images are transferred. A discharge flapper 309 is configured to be swingable about a swing shaft and defines the conveyance direction of the sheet material. When the discharge flapper 309 swings clockwise in FIG. 3, the sheet material is conveyed straight and discharged from the printing apparatus by discharge rollers 310. When the discharge flapper 309 swings counterclockwise, the sheet material is conveyed downward and further conveyed downward by conveyance rollers 312. When reaching the lower end, the sheet is reversed and conveyed upward. At this time, the conveyance path is directed rightward in FIG. 3 by a flapper 311, and the sheet is reversed and guided to a reversing tray. The sheet on the reversing tray is directly guided to the normal conveyance path, and after an image is formed on the surface without an image, discharged from the apparatus by the discharge rollers 310. By the above-described series of sequences, the control unit 205 controls the image forming apparatus 1000 so as to execute single-sided printing.

The image forming apparatus 1000 also includes paper feed units that store sheets needed for print processing. The paper feed units include paper feed cassettes 317 and 318 (each capable of storing, for example, 500 sheets), a paper feed deck 319 (capable of storing, for example, 5,000 sheets), a manual feed tray 320, and the like. The paper feed cassettes 317 and 318 and the paper feed deck 319 can set various kinds of sheets of different sizes or materials for the paper feed units. In addition, the manual feed tray 320 can set various kinds of sheets including special sheets such as an OHP sheet. Each of the paper feed cassettes 317 and 318, the paper feed deck 319, and the manual feed tray 320 is provided with a paper feed roller, and the sheets are continuously fed one by one by the paper feed roller.

The sheet processing device 200 shown in FIG. 3 will be described next. First, the control unit 205 causes a printed sheet of a job to pass a point A in FIG. 3 and conveys it into the large capacity stacker. After that, the control unit 205 causes the large capacity stacker 200 to execute stacking processing of the job. Then, the control unit 205 causes a discharge destination X in the large capacity stacker 200 to hold the printed product of the job that has undergone the stacking processing by the large capacity stacker 200 without conveying the printed product to another device (for example, a device connected downstream). This allows the user to extract the printed product held at the discharge destination X shown in FIG. 3 directly from the portion of the discharge destination X. However, during printing, the cover of an extraction port to the discharge destination X in the large capacity stacker 200 is locked, and extraction is impossible. For this reason, to extract the stacked sheet, it is necessary to temporarily stop printing and cancel the lock.

Additionally, in this embodiment, various kinds of user interfaces that are user interfaces provided by the image forming apparatus 1000 and are configured to interactively respond to an operation of an operator function as execution request accepting means. Examples are the operation unit 204 and/or software keys and hardware keys provided on the operation unit 204. Note that this is merely an example and is not limited to this. For example, a job execution request may be accepted from an external device different from the image forming apparatus 1000. In this case, for example, a user interface provided in an external data generation source such as the PC 105 functions as the execution request accepting means.

Details of Image Forming Unit

Figure 5:
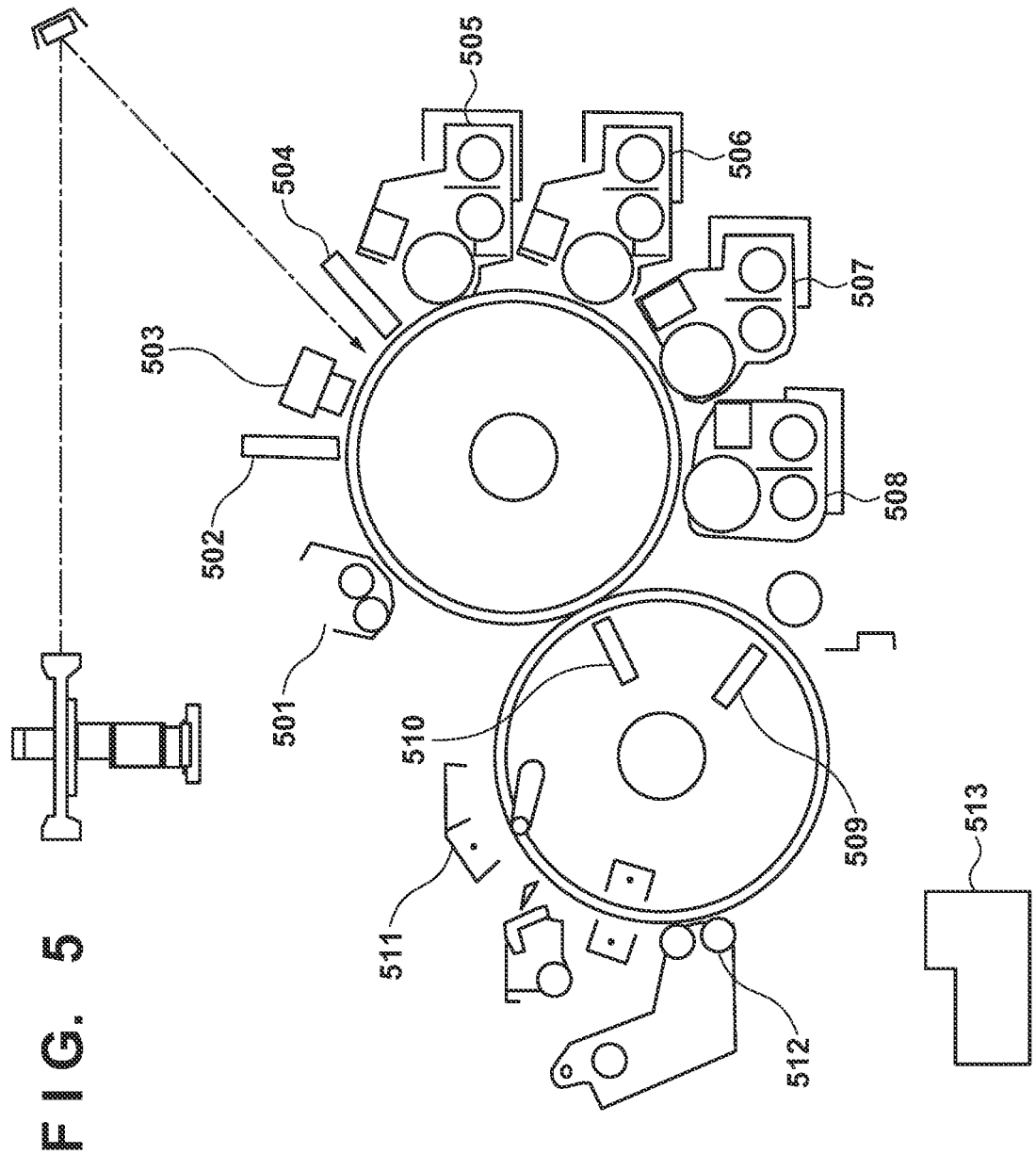
FIG. 5 is an enlarged view of the image forming unit of the image forming apparatus.

Furthermore, FIG. 5 is an enlarged sectional view of an image forming unit that is partially simplified in FIG. 3. The photosensitive drum rotates clockwise in accordance with output instruction information. A description will be made sequentially from a cleaner unit.

A cleaner unit 501 collects a toner adhered to the photosensitive drum and cleans the drum surface. The collected toner is put in a collected toner case 513. A pre-exposure LED 502 is used to remove residual charges on the photosensitive drum. A primary charger 503 includes a discharge device called a grid, and sets the drum surface potential in a predetermined state. A potential sensor 504 measures the surface potential of a portion irradiated with a laser beam or a primary charge potential without exposure. After power ON, the surface potential is measured at a timing such as the time of output of a predetermined number of sheets, and the light amount of the laser, the charge bias, the developing bias, and the like are appropriately changed. Four developers 505 to 508 are provided and arranged sequentially from the upper side in the order of Yellow, Cyan, Magenta, and Black. Yellow is used for image formation of the first color. Each developer contacts the photosensitive drum at a predetermined timing and forms a toner image in a latent image portion. After that, a sheet is conveyed at a predetermined timing, and the sheet is attracted to the transfer drum by an attraction charger 509. The attracted sheet undergoes electrostatic transfer by a transfer charger 510 and advances to the next color. As the procedure on the drum, the procedure from the cleaner unit is repeated. The processing advances to Cyan as the second color, Magenta as the third color, and Black as the fourth color. The sheet that has undergone the transfer of Black is separated by a separation charger 511, and sent to a fixing device (not shown). After the toner image is fixed by applying a pressure and heat, the sheet is discharged from the main body. Dirt on the transfer drum is scraped by a fur brush 512 to prepare for the next job. Wasted toner collected from the transfer drum 305 and the like is stored in the collected toner case 513.

Details of Sheet Processing Device (Stacker)

Figure 6:
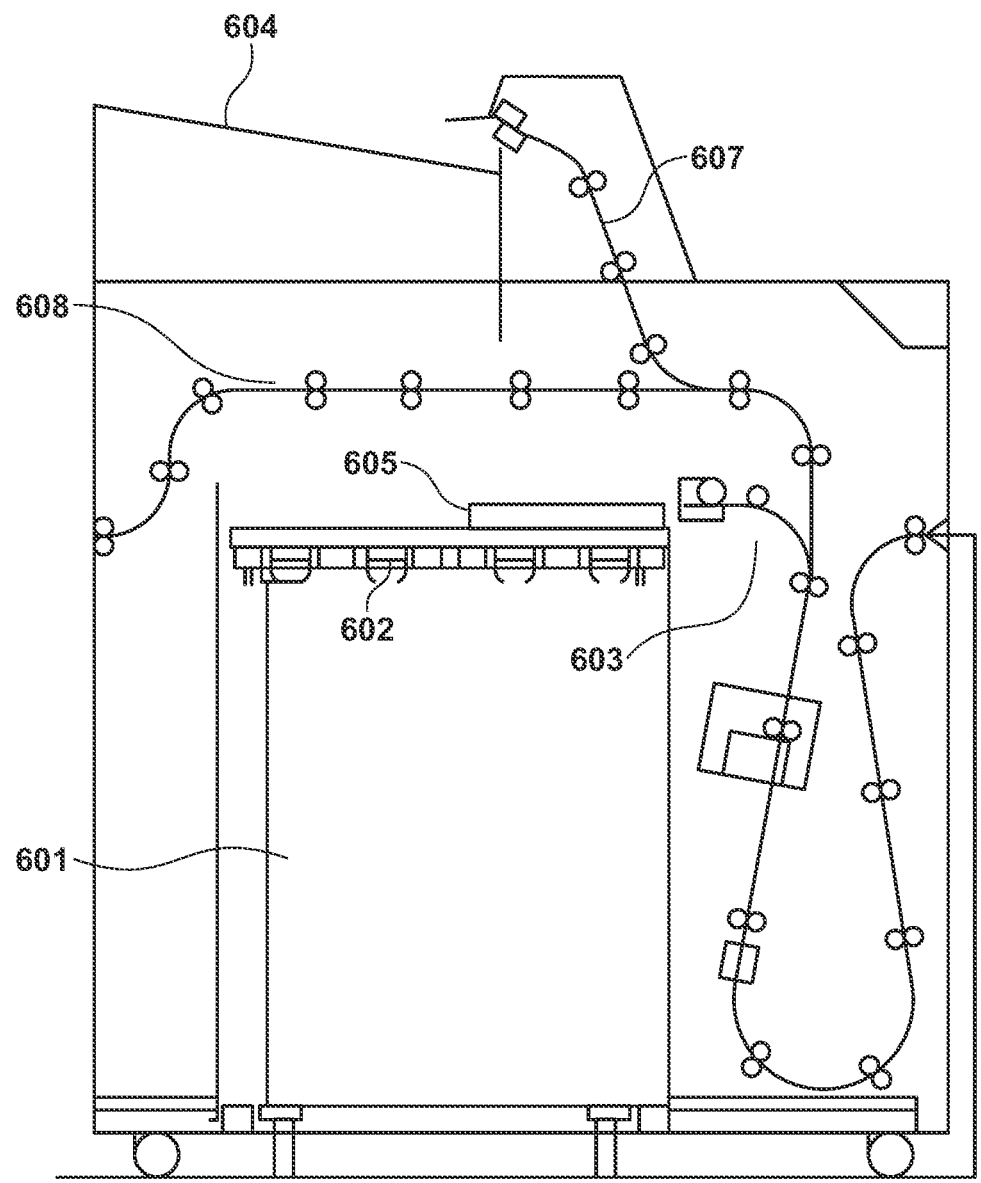
FIG. 6 is a sectional view of a large capacity stacker.

A stacker used as an example of the sheet processing device in this embodiment will be described next with reference to FIG. 6. FIG. 6 is an enlarged view of the sheet processing device (large capacity stacker) that is partially simplified in FIG. 3. The large capacity stacker 200 includes a stack unit 601 configured to store sheets. A stack tray 602 configured to stack sheets is provided in the stack unit 601. The stack tray is configured to stack almost 5,000 large sheets or about 10,000 small sheets, is configured to gradually lower along with stacking of a product 605. A sheet conveyed from the upstream side is stacked in the stack tray via a stack path 603 and stored in the stack unit. Additionally, to refer to a print sample during output, a sample tray 604 is also provided. The product 605 output to the stack tray of the stacker cannot be immediately taken and confirmed. Hence, a sample during output is separately output to the sample tray 604, thereby allowing the user to take it and confirm the printing state. The sample tray is also used for the purpose of escape in a case in which sheets cannot be stacked in the stack unit 601 for some reason or in a case in which a paper jam has occurred. For output to the sample tray, a sheet conveyed from the upstream side is conveyed using a sample tray discharge path 607 and discharged to the sample tray. On the other hand, the stacker is configured to be able to convey a sheet to the downstream side as well, and a post-processing device such as a finisher can also be attached on the downstream side. In this case, a sheet conveyed from the upstream side is conveyed using a straight path 608 and conveyed to the post-processing device connected on the downstream side.

Portable Terminal

The portable terminals 103 and 104 will be described next with reference to the block diagram of FIG. 7. Each of the portable terminals 103 and 104 includes a terminal control unit 701 that generally controls the terminal itself. A ROM 702, a RAM 703, an external I/F 704, an HDD 705, and an operation/display unit 706 are connected to the terminal control unit 701 via a bus. The terminal control unit 701 includes, for example, a CPU and executes the programs of the procedures shown in FIGS. 8A and 9, which is stored in the ROM 702 or the like. The ROM 702 stores various kinds of programs, and these programs are loaded and executed by the terminal control unit 701 as needed. The RAM 703 is used as a work area when the terminal control unit 701 executes the loaded programs. The external I/F 704 has a role of communicating data with the image forming apparatus 1000 using a wired network such as a LAN or wireless communication such as Wi-Fi. The hard disk drive (HDD) 705 is used to record various kinds of data, files, and the like, which should be saved irrespective of ON/OFF of power. The operation/display unit 706 has the structure of a touch panel, and the state of an error (details such as a type and the information of the image forming apparatus in which an error has occurred) in the image forming apparatus 1000, which is received via the external I/F 704, is displayed. Furthermore, the operation/display unit 706 also functions as an instruction accepting means for accepting an operation from the user via the touch panel, and provides a user interface.

Error Handling Notification Processing in Image Forming System (Outline)

An explanation of contents to be described in this embodiment will be made next. First, before a detailed description, the outline of this embodiment will be described with reference to the sequence chart of FIG. 14. In this embodiment, an environment including the image forming apparatus 1000 and the two portable terminals 103 and 104 configured to be communicable with the image forming apparatus 1000 will be used in the explanation. In addition, each of the portable terminals 103 and 104 is assumed to be in a usable state and held by a user who is involved in an operation. First, each user registers a corresponding one of the held portable terminals 103 and 104 as a notification target in the image forming apparatus 1000 whose state should be monitored (step S1401). Accordingly, the image forming apparatus 1000 sequentially performs registration (step S1402). Next, if an error, for example, an error serving as a cause of an interrupt of image formation occurs in the image forming apparatus 1000 (step S1403), the portable terminals 103 and 104 registered in advance are immediately notified of the error occurrence (step S1404), and a screen to notify the error occurrence is displayed on each of the portable terminals 103 and 104 (step S1405).

Here, in this embodiment, the user who holds the portable terminal 104 declares to the image forming apparatus 1000 that he/she performs the recovery operation of the error that has occurred (step S1404). Accordingly, the image forming apparatus 1000 determines that the recovery operation is started (step S1407) and notifies the portable terminals 103 and 104 of it (step S1408). Upon receiving the notification, the portable terminals 103 and 104 perform screen display during the recovery operation (step S1409). When the error is eliminated (step S1410), the image forming apparatus 1000 notifies the portable terminals 103 and 104 of it (step S1411). Upon receiving the notification, the portable terminals 103 and 104 clear the error screen (step S1412). This is a series of procedures to be described in this embodiment.

Error Handling Notification Processing in Image Forming System (Details)

Figure 8A:
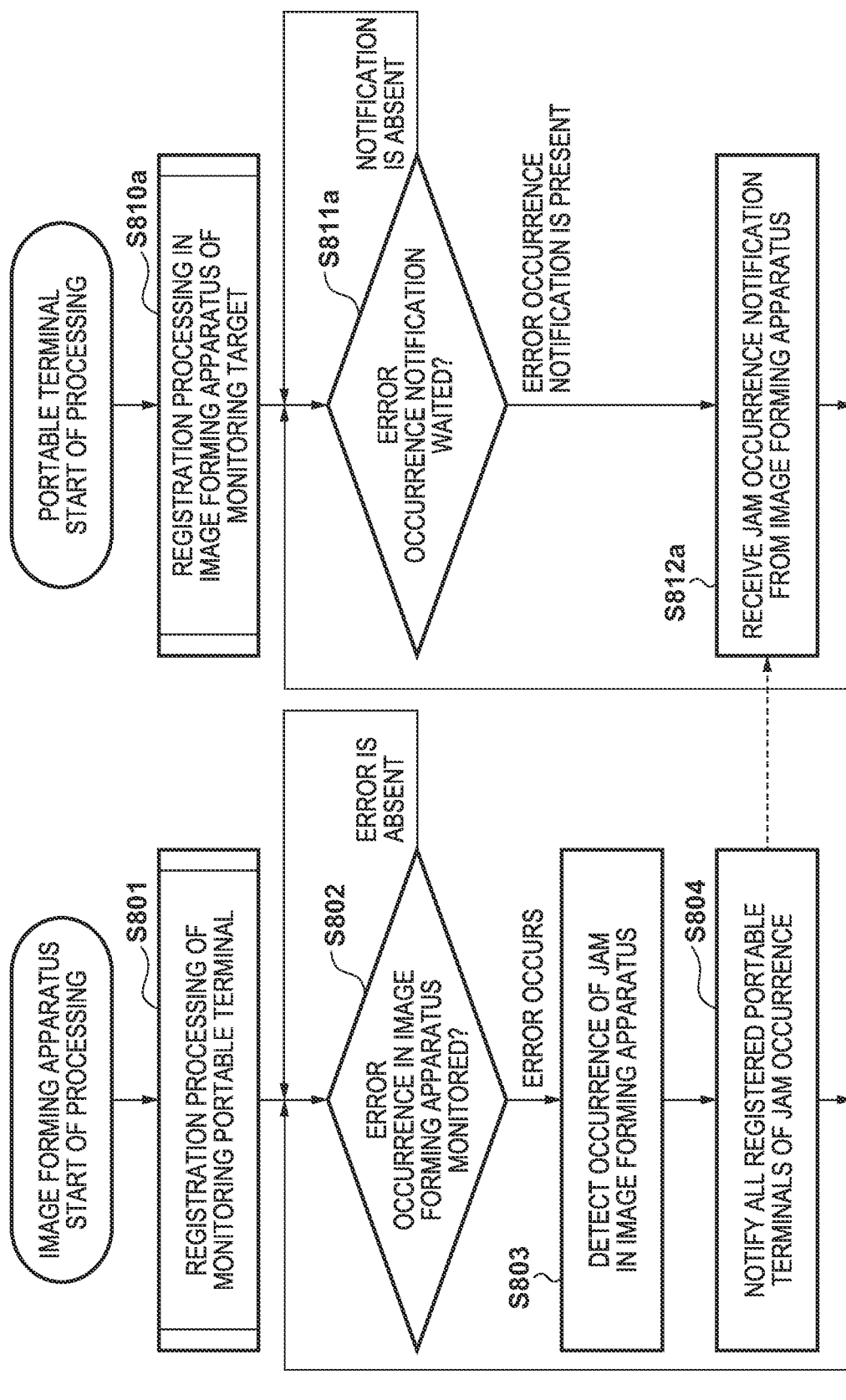

Detailed processing contents of the series of procedures described above will be explained next with reference to the flowchart of FIGS. 8A and 8B. Note that in this embodiment, since the image forming apparatus 1000 and the portable terminals 103 and 104 operate in cooperation, the processing flowcharts of these are divisionally shown on the left and right sides to easily know the association. In addition, broken line arrows in FIGS. 8A and 8B are explanatory auxiliary lines drawn to associate reception and transmission with each other, and are added for the purpose of assisting understanding of the contents of the processing.

First, the control unit 205 of the image forming apparatus 1000 and the terminal control unit 701 of the portable terminals 103 and 104 perform registration processing of monitoring portable terminals that are targets to be notified of an error when an error occurs in the image forming apparatus 1000 (steps S801 and S810a). Concerning this processing, an explanation will further be added with reference to the flowchart of FIG. 9. Note that FIG. 9 also divisionally shows the processing flowcharts of the image forming apparatus 1000 and the portable terminals 103 and 104 on the left and right sides, like FIGS. 8A and 8B.

Figure 9:
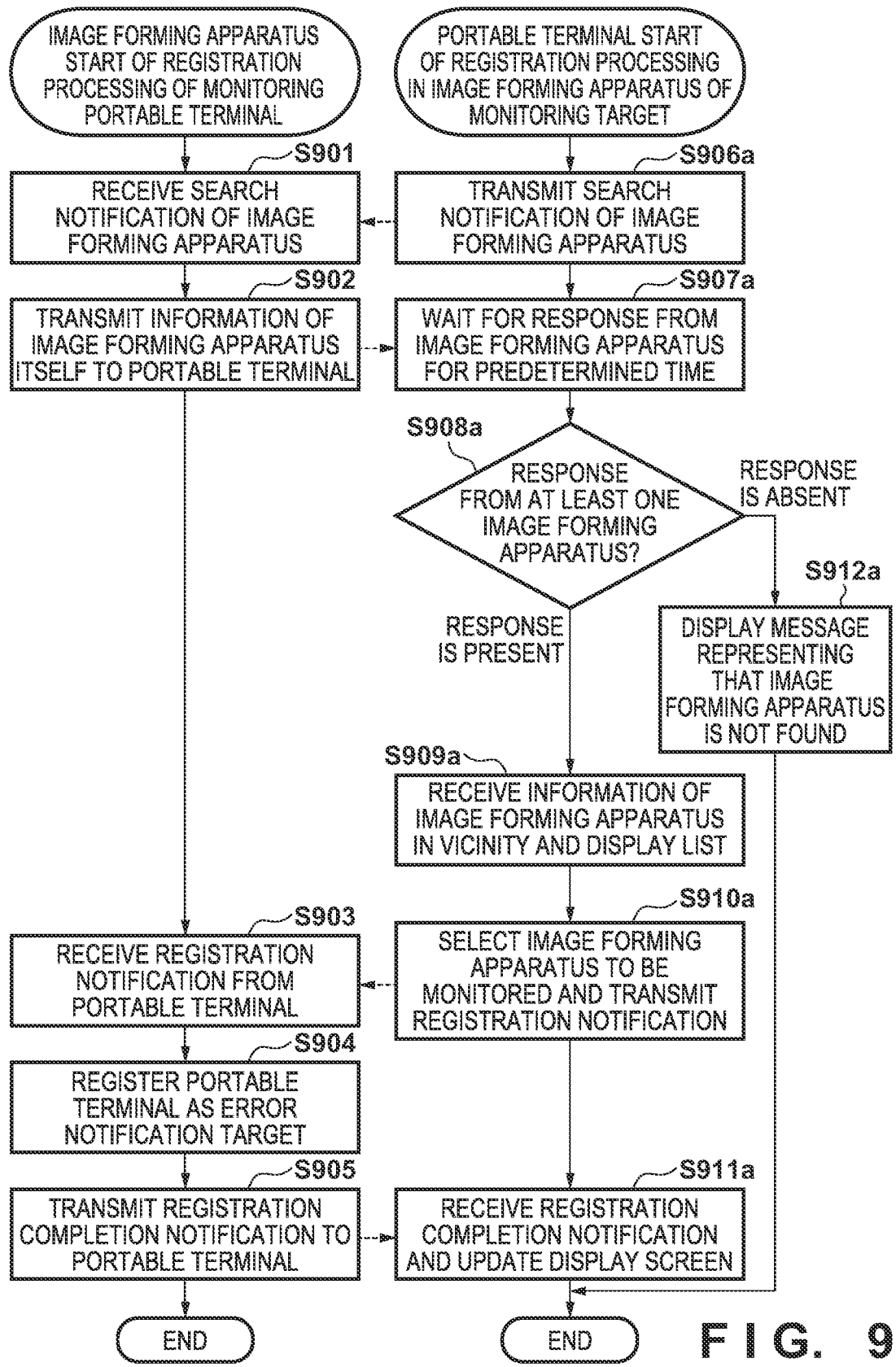
FIG. 9 is a flowchart of registration processing of a monitoring portable terminal to the image forming apparatus.
Figure 10A:
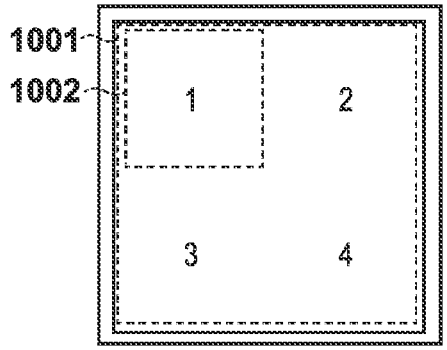
FIGS. 10A to 10H are views of examples of screens of the portable terminal.

Referring to the flowchart of FIG. 9, first, the operation/display unit 706 of each of the portable terminals 103 and 104 displays a screen as shown in FIG. 10A. FIG. 10A shows an example of the TOP screen of the portable terminals 103 and 104 to be described in this embodiment. The screen includes a monitoring target registration region 1001 in which four image forming apparatuses to be monitored can be registered at maximum. In this embodiment, four image forming apparatuses can be registered at maximum. However, this is merely an example, as a matter of course, and the region may be configured to register less or more image forming apparatuses. Here, to add a monitoring target in a first region 1002, in this embodiment, the instruction is input by pressing the first region 1002 for a long time. More specifically, first, the terminal control unit 701 of each of the portable terminals 103 and 104 detects that the first region 1002 is pressed for a long time via the operation/display unit 706. Then, the terminal control unit 701 controls the external I/F 704 and controls to notify, by broadcast, the network to which the portable terminal belongs of a search notification of the image forming apparatus 1000 (step S906a). The terminal control unit 701 then starts processing of waiting for a response to the search notification for a predetermined time defined in advance (step S907a). After the elapse of the predetermined time in step S907a, the terminal control unit 701 advances to processing of determining whether a response is received from at least one image forming apparatus 1000 (step S908a).

The processing procedure of the image forming apparatus 1000 will be described next. The control unit 205 of the image forming apparatus 1000 receives, via the external I/F 202, the broadcast of the search notification of the image forming apparatus 1000 transmitted from each of the portable terminals 103 and 104 in step S906a described above (step S901). Next, the control unit 205 transmits the information of the image forming apparatus itself to the portable terminals of the source that has transmitted the search notification (step S902). This corresponds to the "response" in step S907a described above, and includes network information such as the IP address of the image forming apparatus 1000 and information such as the name of the device.

Figure 10B:
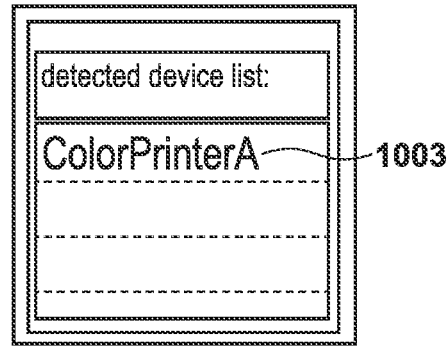

Returning to the description of the processing procedure of the portable terminals 103 and 104, when the response of the search is transmitted from the image forming apparatus in step S902 described above, and it is determined in step S908a that "response is received", the terminal control unit 701 receives the information of the image forming apparatus from the communication contents. The information is displayed on the operation/display unit 706 (step S909a). FIG. 10B shows an example of the screen displayed at that time. If a plurality of image forming apparatuses have responded to the search notification transmitted in step S906a, the plurality of image forming apparatuses are displayed in a searched image formation list 1003. FIG. 10B shows an example in which one image forming apparatus 1000 having a name "ColorPrinterA" has responded to the search notification. Next, when an image forming apparatus to be monitored by the user is selected from the searched image formation list 1003 in step S909a, the terminal control unit 701 sends a registration notification to the image forming apparatus via the external IF 704 (step S910a). In this embodiment, the one image forming apparatus 1000 listed in FIG. 10B is selected as the image forming apparatus of the monitoring target.

Returning to the description of the processing procedure of the image forming apparatus, when the registration notification is transmitted from each of the portable terminals 103 and 104 in step S910a described above, the control unit 205 receives the transmitted registration notification (step S903). Then, the control unit 205 registers (saves data) information, for example, address information such as an IP address of each of the portable terminals 103 and 104, which is the transmission source of the registration notification received in step S903, in the HDD 209 as a portable terminal of an error notification target (step S904). Finally, the control unit 205 transmits a message representing that the registration is completed to the portable terminals 103 and 104 (step S905).

Figure 10C:
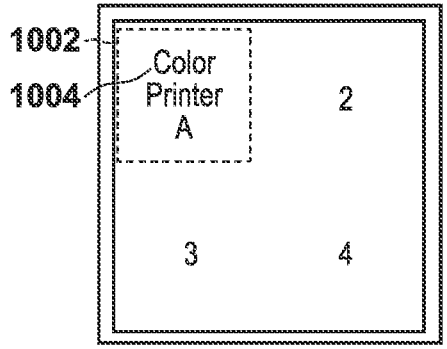
Figure 10D:
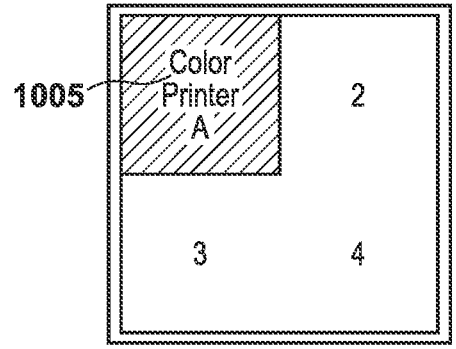
Figure 10E:
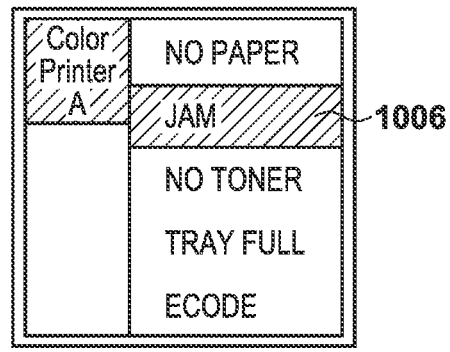
Figure 10F:
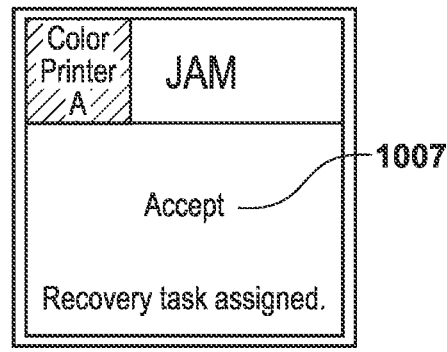
Figure 10G:
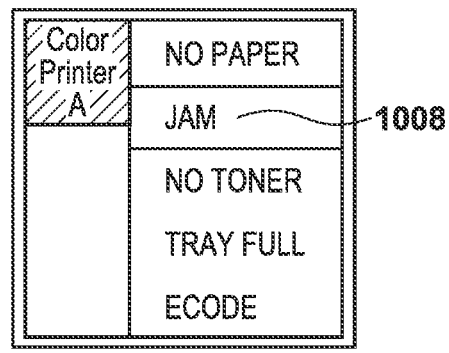
Figure 10H:
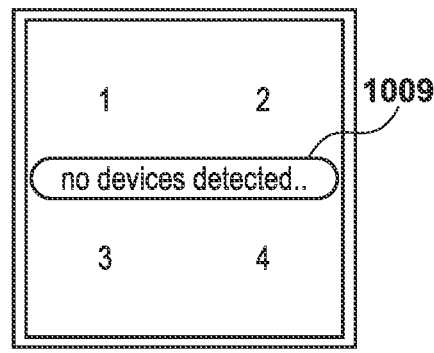
Figure 11:
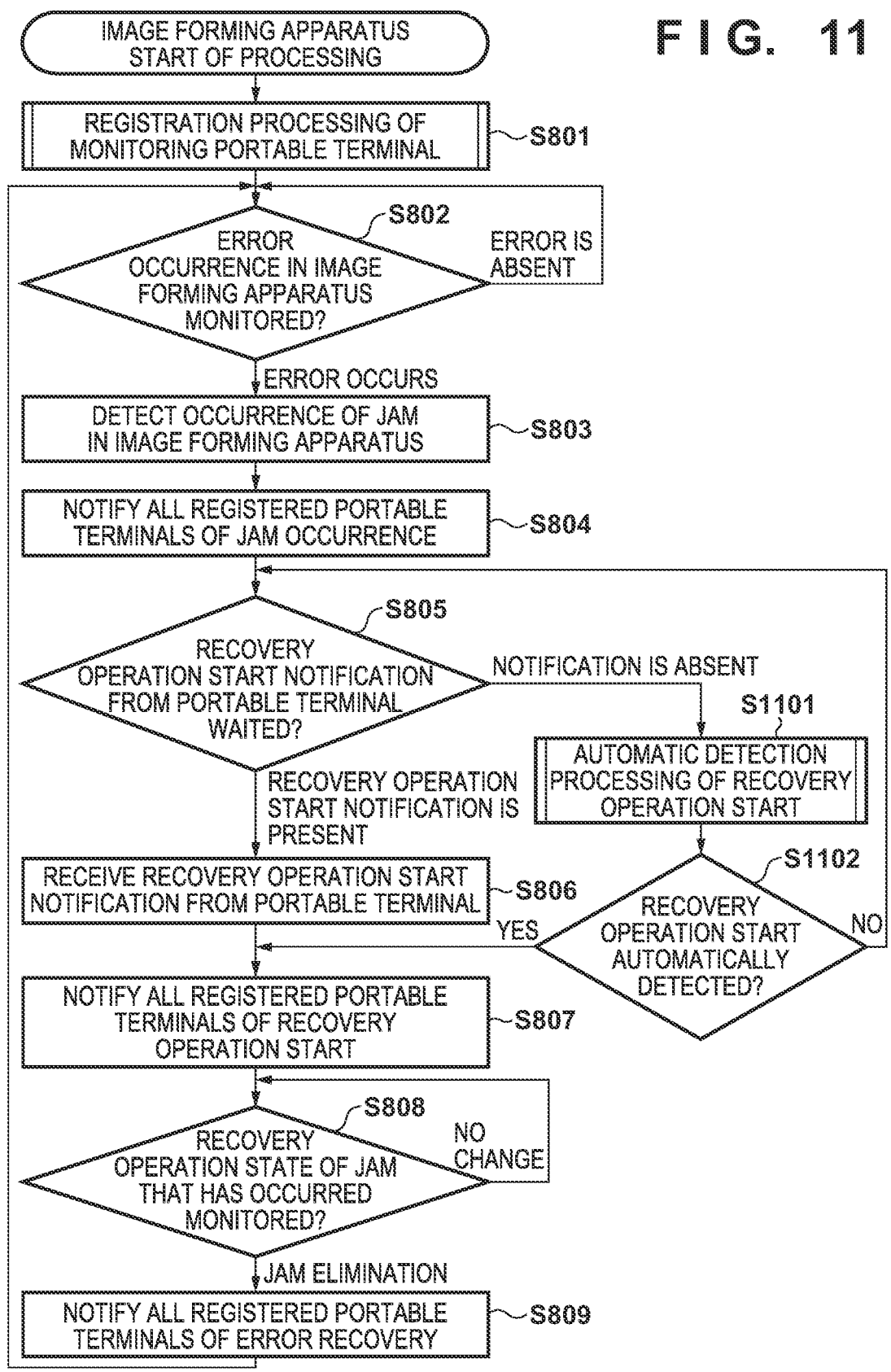
FIG. 11 is a flowchart according to the second embodiment.

On the other hand, the terminal control unit 701 of each of the portable terminals 103 and 104 receives the registration completion notification transmitted in step S905 and updates the display screen (step S911a). FIG. 10C shows an example. When the registration in the image forming apparatus is completed, an image forming apparatus name 1004 of the registration target is displayed in the first region 1002 selected in step S906a. In the above-described way, the portable terminals 103 and 104 that are the partners to which error information is to be transmitted at the time of an error occurrence in the image forming apparatus 1000 are registered in the image forming apparatus 1000. On the other hand, upon determining in step S908a that a response is not received from any image forming apparatus, the terminal control unit 701 displays a message representing it on the operation/display unit 706 (step S912a) and ends the processing. FIG. 10H shows an example, and a message 1009 representing that no image forming apparatus could be detected is popped up in the TOP screen.

Referring back to the flowchart of FIGS. 8A and 8B, the description of this embodiment will be continued. When the registration processing of the portable terminals 103 and 104 that are the partners to which error information is to be transmitted ends in step S801, the control unit 205 of the image forming apparatus 1000 starts monitoring processing of an error occurrence in the image forming apparatus 1000 (step S802).

Example of Error Detection

Concerning the error occurrence monitoring processing, an explanation will be added using paper jam (sheet jam), paper shortage (sheet shortage), toner shortage (color material shortage), collected toner full, and stacker capacity full (stacker full) as examples.

A plurality of sensors are provided in the conveyance path of the image forming apparatus 1000 described with reference to FIG. 3. By generally using the sensor values, the control unit 205 always monitors whether sheet conveyance is performed at a designed timing. If a sheet slips or is caught in conveyance, the control unit 205 immediately detects a jam based on the sensor values. The control unit 205 is also configured to know where a sheet remains in the conveyance path due to the occurrence of the jam.

In addition, each of the paper feed units 317 to 320 shown in FIG. 3 includes a sensor configured to detect the presence/absence of a sheet. The control unit 205 detects a paper shortage based on the sensor values.

Each of the developers 505 to 508 shown in FIG. 5 includes a buffer configured to temporarily store and stir a toner flowing from a toner bottle. A sensor configured to determine the presence/absence of an inflow is attached to the toner inlet of each buffer. The control unit 205 is configured to be able to immediately detect a toner shortage if the toner bottle becomes empty, and the inflow of the toner stops. Note that an example in which the toner shortage is detected at the point of time when the toner bottle becomes empty has been described here. However, strictly speaking, printing can be performed until the toner remaining in the buffer of the developer is exhausted. Hence, the control unit 205 may be configured to detect the toner shortage using another sensor when the toner in the buffer of the developer is also exhausted.

Additionally, a transmission-type sensor is provided near the inlet of the collected toner case 513 shown in FIG. 5. When the sensor is shielded by the collected toner deposited in the collected toner case 513, the control unit 205 determines that the collected toner is deposited up to the vicinity of the inlet, and detects collected toner full.

As described with reference to FIG. 6, the stack tray 602 of the large capacity stacker 200 is configured to gradually lower along with stacking of the product 605. Upon detecting that the stack tray 602 has lowered up to a predetermined position, the control unit 205 detects stacker capacity full.

In this way, the control unit 205 performs error occurrence monitoring processing in step S802. Note that various errors and error detection methods other than those described above have been proposed. General detection methods are sufficiently known, and a detailed description thereof will be omitted. In addition, the types of errors described here are merely examples, and the present invention is not limited to these.

Processing at Time of Error Detection

A case in which an error is detected after the error monitoring is started in step S802 will be described next. The following explanation will be made using, as an example, a case in which the occurrence of a jam is detected as a detailed error.

That is, next, the control unit 205 detects that a jam has occurred in the image forming apparatus 1000 (step S803). The control unit 205 then notifies the portable terminals 103 and 104 registered in step S801 as the error notification destinations in the image forming apparatus 1000 of the occurrence of the jam (step S804). The control unit 205 advances to processing of waiting for a recovery operation start notification from each of the portable terminals 103 and 104 (step S805).

On the other hand, processing of the portable terminals 103 and 104 will be described next. When the registration processing in the image forming apparatus 1000 is ended in step S810a described above, the terminal control unit 701 of each of the portable terminals 103 and 104 starts processing of waiting for an error occurrence notification (step S811a). When the error notification of the jam occurrence is done in step S804 described above, the terminal control unit 701 determines in step S811a that an error occurrence notification is present. The terminal control unit 701 then receives the error notification of the jam occurrence transmitted from the image forming apparatus 1000 (step S812a). Next, the terminal control unit 701 displays, on the operation/display unit 706, a screen (error notification screen) to notify the occurrence of the jam in the image forming apparatus of the monitoring target (step S813a). FIGS. 10D and 10E show an example. Referring to FIG. 10D, on the TOP screen of each of the portable terminals 103 and 104, the first region 1002 in which the image forming apparatus with the error is registered changes to black reverse display 1005. This allows the user to recognize at a glance which image forming apparatus the error has occurred in. Additionally, when the user taps the portion of the black reverse display 1005, the terminal control unit 701 displays, on the operation/display unit 706, the screen shown in FIG. 10E representing the type of the error that has occurred in the image forming apparatus 1000 of the monitoring target registered in the portion. In the screen shown in FIG. 10E, the portion of the type of the error that has occurred changes to black reverse display 1006, and the user can recognize the type of the error that has occurred.

Next, the terminal control unit 701 performs processing of accepting the start of a recovery operation for the error from the user and notifying the image forming apparatus of it (step S814a). FIG. 10F shows an example of a screen (recovery operation start screen) used at this time. When the user taps the error type portion displayed in the black reverse display 1006 in FIG. 10E, the terminal control unit 701 then displays the screen shown in FIG. 10F on the operation/display unit 706. The screen shown in FIG. 10F is a screen that accepts the user's intention representing whether to start the recovery operation for the error whose occurrence has been notified. When a portion 1007 where "Accept" is displayed is tapped, the terminal control unit 701 determines that an instruction of the recovery operation start is accepted. The terminal control unit 701 then notifies the image forming apparatus 1000 of the start of the recovery operation (step S814a). The notification from each of the portable terminals 103 and 104 corresponds to the "recovery operation start notification" in step S805 described above.

Returning to the description of the processing procedure of the image forming apparatus 1000, when notified of the start of the recovery operation from each of the portable terminals 103 and 104 in step S814a, the control unit 205 of the image forming apparatus 1000 determines in step S805 that the recovery operation start notification is present. The control unit 205 then receives the recovery operation start notification from each of the portable terminals 103 and 104 (step S806). The control unit 205 determines that the recovery operation for the jam that has occurred is started, and notifies the portable terminals 103 and 104 registered as the error notification destinations in the image forming apparatus 1000 in step S801 that the recovery operation for the jam is started (step S807). The control unit 205 then advances to processing of monitoring the state of the jam during the recovery operation (step S808). On the other hand, when notified of the start of the recovery operation from the image forming apparatus in step S807, the terminal control unit 701 receives the notification of the recovery operation start (step S815a). The terminal control unit 701 then displays a recovery operation screen on the operation/display unit 706 (step S816a). FIG. 10G shows an example. The portion of the black reverse display in FIG. 10E changes to display in which only characters are shown as black characters. When the display is thus changed from the display shown in FIG. 10E to that shown in FIG. 10G upon receiving the notification of the recovery operation start from the image forming apparatus, the user can recognize that the jam still remains but someone is doing the recovery operation.

Returning to the description of the processing procedure of the image forming apparatus 1000, when the jam is canceled in the image forming apparatus 1000, the control unit 205 of the image forming apparatus 1000 determines in step S808 that the jam is canceled. The control unit 205 then notifies the portable terminals 103 and 104 registered as the error notification destinations in the image forming apparatus 1000 in step S801 of the recovery of the jam (error recovery notification) (step S809). The control unit 205 returns to the processing of step S802 to monitor an error occurrence again. On the other hand, the terminal control unit 701 of each of the portable terminals 103 and 104 receives the error recovery from the image forming apparatus 1000 (step S817a). The terminal control unit 701 controls to clear error display displayed on the operation/display unit 706 (step S818a) and return the display to the screen display shown in FIG. 10C after the end of the processing of step S810a, and returns to the processing of step S811a.

With this control, the notification of the error and the notification of the start of the recovery operation can be made, and a state such as an error state left unrecovered or conflict of operations can be expected to be avoided.

Note that in step S807 of FIGS. 8A and 8B, all the registered portable terminals are notified of the recovery operation start. Instead, the notification may be made for portable terminals except the transmission source of the recovery operation start notification received first in step S806. This makes it possible to notify the second or subsequent portable terminal that has transmitted the recovery operation start notification that the recovery operation start notification transmitted by the portable terminal is not the first notification. It is therefore possible to prevent duplication of the operator and further improve the operation efficiency. Alternatively, the notification contents may be changed between the recovery operation start notification to the portable terminal that is the first transmission source of the recovery operation start notification and the recovery operation start notification to other portable terminals. In this case, the portable terminal that has received the recovery operation start notification performs display according to the notification contents. For example, the color may be changed, and the display form such as the presence/absence of blinking may be changed. Furthermore, in this case, in accordance with the contents of the error, a plurality of operators may be ensured by transmitting, to a predetermined number of second and subsequent portable terminals that have transmitted the recovery operation start notification, a message representing as if they were the transmitter of the first recovery operation start notification. The above explanation also applies to the second embodiment to be described below.

Second Embodiment

The second embodiment of the present invention will be described next. In the above-described embodiment, the start of the recovery operation is detected by receiving the notification. In the second embodiment, an example in which an image forming apparatus 1000 automatically detects the start of a recovery operation for an error that has occurred in the image forming apparatus 1000 will be described with reference to the flowchart of FIG. 11. Concerning the second embodiment, a sequence chart for explaining the outline is not provided. In this example, after step S1405 of FIG. 14, the image forming apparatus 1000 automatically determines the recovery operation start (step S1407) without the declaration of the recovery operation start from the user (step S1406). However, the processing is different from the flowchart of FIGS. 8A and 8B in the portion of steps S1101 and S1102, and only the difference will be described here.

First, in step S805 described with reference to FIG. 8B, a control unit 205 of the image forming apparatus 1000 starts processing of waiting for a start notification of a jam recovery operation. The processing up this point is the same as the contents described with reference to FIGS. 8A and 8B, and a description thereof will be omitted. Here, if the notification is absent in step S805, the control unit 205 performs automatic detection processing of the recovery operation start (step S1101). If the recovery operation start is not automatically detected in step S1101, the control unit 205 returns to step S805 to continue the processing. On the other hand, upon determining in step S1102 that the recovery operation start is automatically detected, the control unit 205 advances to step S807 to notify portable terminals 103 and 104 registered as the error notification destinations in the image forming apparatus 1000 in step S801 that the recovery operation is started.

Figure 12:
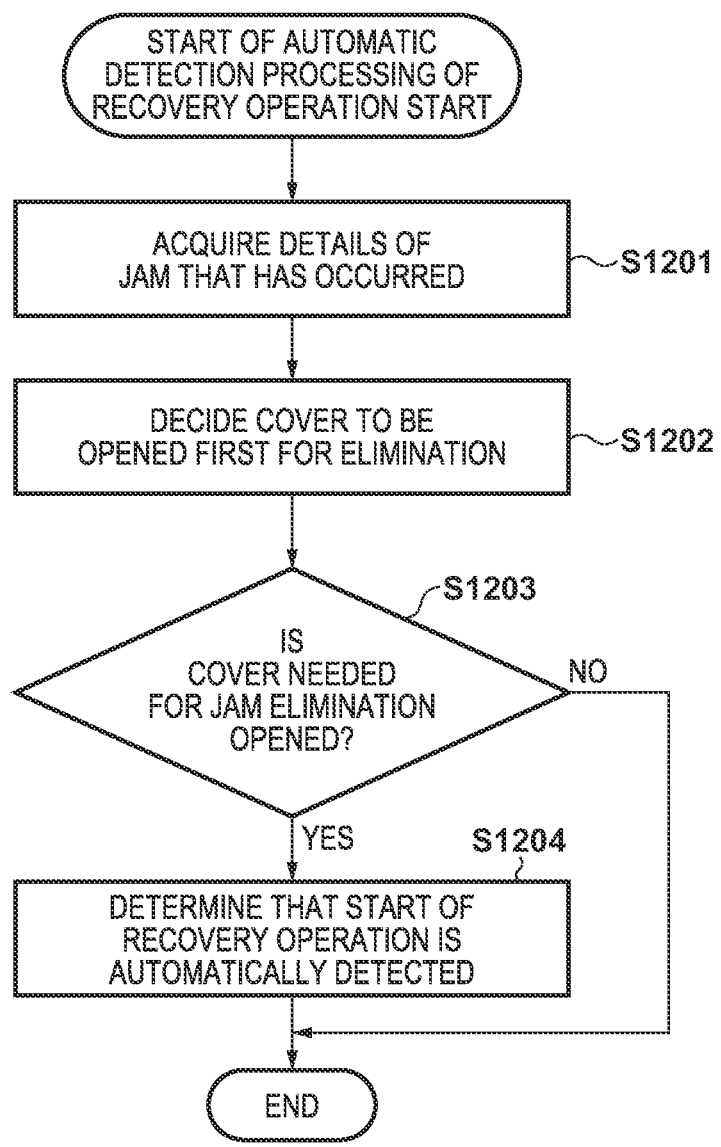
FIG. 12 is a flowchart concerning automatic detection of the start of a jam recovery operation.
Figure 13A:
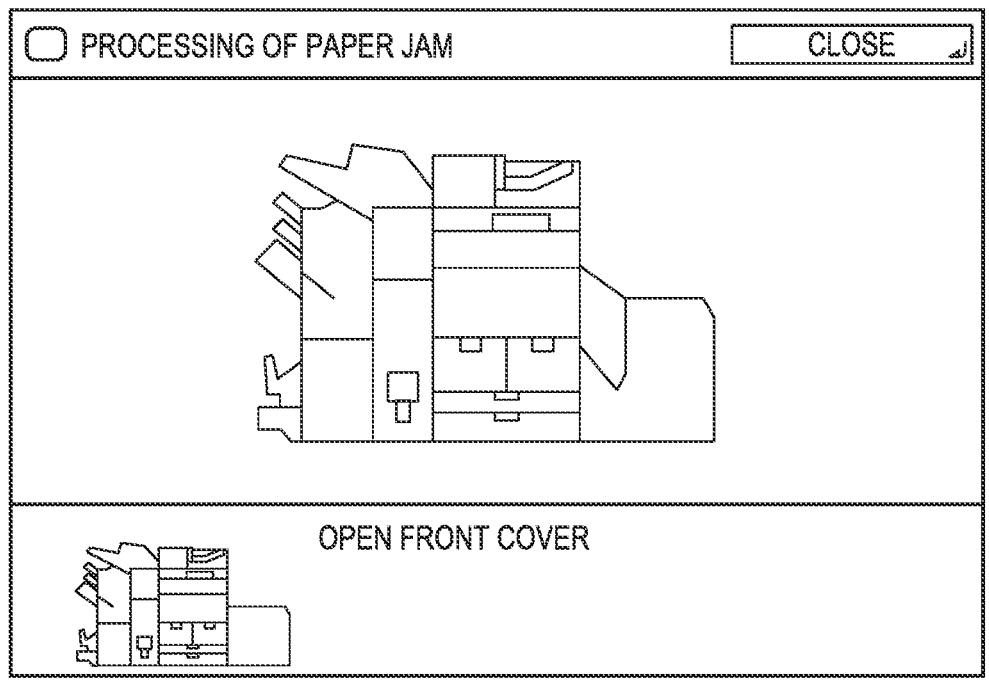
FIGS. 13A, 13B, and 13C are views of examples of screens displayed at the time of an error occurrence.

The automatic detection processing of the recovery operation start in step S1101 will be described here with reference to the flowchart of FIG. 12. First, the control unit 205 of the image forming apparatus acquires the detailed information of the jam such as the location of the jam that has occurred and the location of the remaining sheet (step S1201). Next, based on the acquired detailed information of the jam, the control unit 205 specifies the cover that needs to be opened first to eliminate the jam (step S1202). The cover specifying processing will be described here. When a jam occurs, the control unit 205 displays a screen showing a jam elimination procedure as shown in FIG. 13A on a touch panel unit 401 of an operation unit 204. Information concerning the jam elimination procedure for each jam portion is designed and recorded in advance in a ROM 207 and an HDD 209. The control unit 205 refers to the jam elimination procedure, thereby specifying the cover that needs to be opened first when eliminating the jam.

Next, the control unit 205 confirms whether the cover specified in step S1202 is opened (step S1203). Upon determining in step S1203 that the cover is opened (YES), the control unit 205 determines that the start of the recovery operation is automatically detected (step S1204). On the other hand, upon determining in step S1203 that the cover is not opened (NO), the control unit 205 ends the processing (the start of the recovery operation is not detected). The result of the determination performed in step S1204 is stored in, for example, a memory configured to save the determination result and referred to in step S1102. Note that to prepare for a case in which it is determined in step S1203 that the recovery operation is not started, the memory configured to store the determination result is preferably initialized, in a step such as step S803 or step S804 before step S1101, by information representing that the recovery operation is not started.

Note that in this embodiment, a jam has been described as an example of an error. An explanation will be added even concerning the automatic detection processing S1101 of the recovery operation concerning a paper shortage, toner shortage, collected toner full, and stacker capacity full. First, concerning the paper shortage, the presence/absence of a sheet is determined by a sensor provided in each of paper feed units 317 to 320, as described above. Hence, the control unit 205 can recognize, based on the sensor values, in which paper feed unit the sheets are exhausted, and when the paper feed unit is opened, determines that the recovery operation for the paper shortage is started. However, the paper feed units in which the start of the recovery operation can automatically be detected are limited to the cassettes 317 and 318 and the paper deck 319, which are closed at the time of paper feed. A tray such as the manual feed tray 320 is usable in an open state even at the time of paper feed, and is therefore handled as a paper feed unit in which the recovery operation cannot automatically be detected in this embodiment.

Figure 13B:
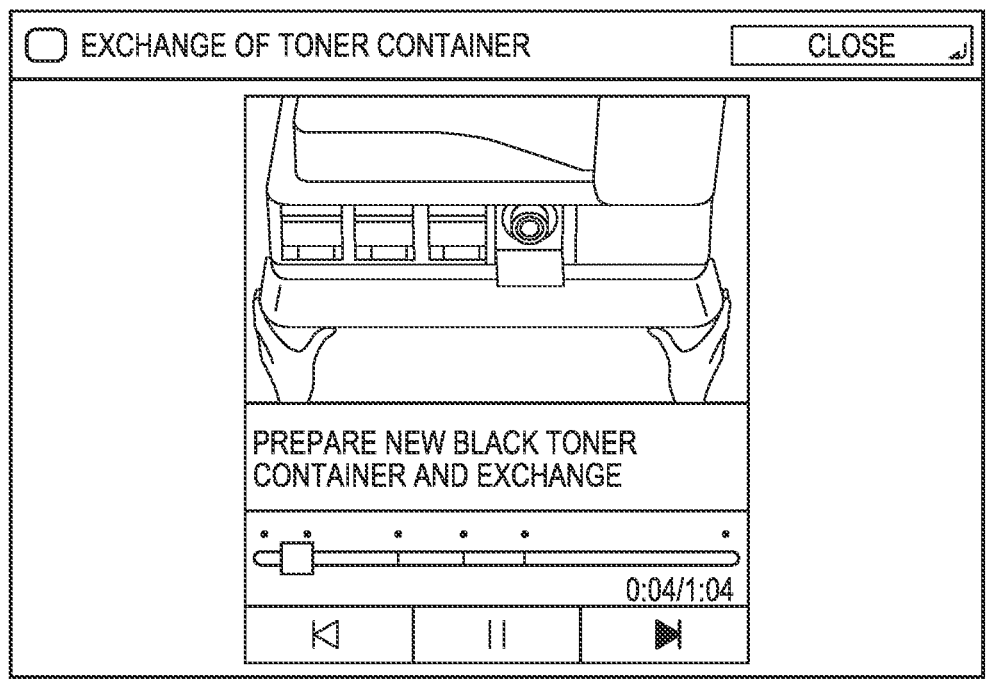
Figure 13C:
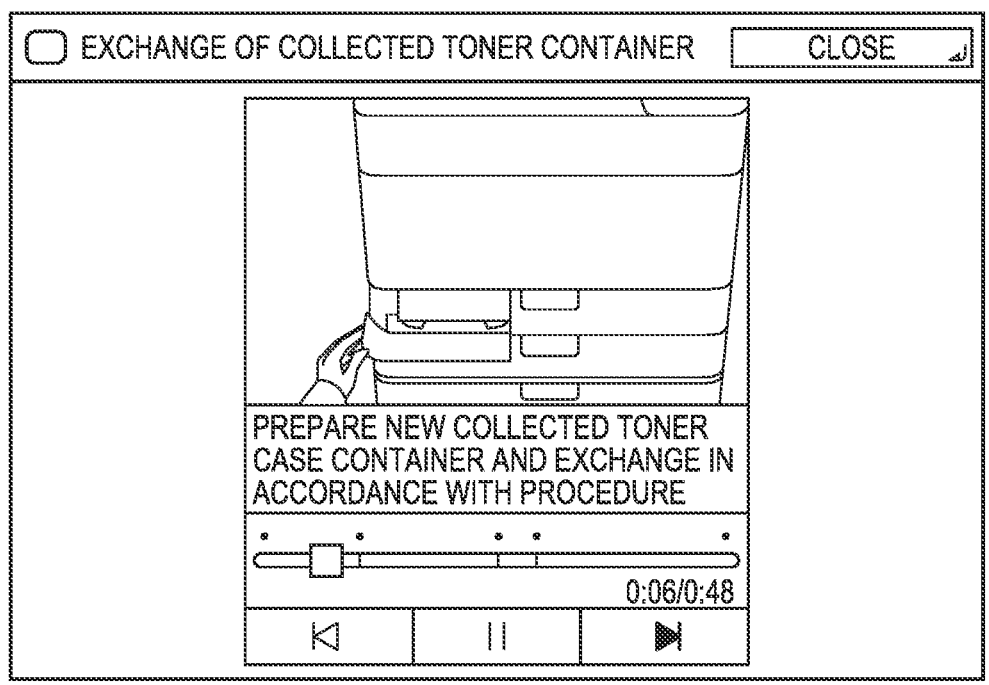

Concerning the toner shortage and the collected toner full, a display representing the operation procedure as shown in FIG. 13B or 13C is performed on the touch panel unit 401 of the operation unit 204, as in the jam occurrence described above. These operation procedures are also designed and recorded in advance in the ROM 207 and the HDD 209. The control unit 205 refers to the operation procedure, thereby specifying the cover that needs to be opened first when performing the operation. When the cover is opened, the control unit 205 determines that the recovery operation for the toner shortage or the collected toner full is started.

The stacker capacity full can be determined based on whether a stack tray 602 has lowered up to the lower limit, as described with reference to FIG. 6. The extraction port of a large capacity stacker 200 has a door. It is essential to open the extraction door when extracting the contents of a stack unit 601. For this reason, when processing of opening the extraction door is performed, the control unit 205 determines that the recovery operation for the stacker capacity full is started.

When the automatic detection of the recovery operation is performed in this way, it is possible to detect the start of the recovery operation while saving the labor of the user to instruct the start of the recovery operation. As for the start of the recovery operation, the original operation start timing is the timing at which the user receives an error notification and starts moving to the target image forming apparatus or starts a certain preparation. However, when the start of the recovery operation is detected from a change in the state of the image forming apparatus in this way, a time lag from the original operation start timing occurs. For this reason, the automatic detection of the recovery operation explained in this embodiment is preferably executed in parallel to the method of instructing the operation start by the user, which has been described in the first embodiment. This is sufficiently effective as a backup function in case of user's forgetfulness of the operation start.

Note that in the above embodiments, an electrophotographic image forming apparatus has been described. However, an image forming apparatus of another type, for example, an inkjet image forming apparatus may be used. In addition, the image forming apparatus may have an arrangement that does not include a scanner or a post-processing device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-098060 filed May 22, 2018 which is hereby incorporated by reference herein in its entirety.

What is claimed is:

1. An image forming apparatus capable of communicating with portable terminals via a wireless network, comprising:
   a cassette that stores sheets;
   an image forming device that forms an image on a sheet conveyed from the cassette;
   a sensor that detects presence/absence of a sheet in the cassette;
   a network interface for communicating with the portable terminals via the wireless network;
   a memory for registering an address of at least one of the portable terminals as a target to which an error is notified; and
   a controller for controlling the network interface, in a case where the address is registered in the memory, such that:
      the network interface transmits error occurrence information indicating occurrence of a sheet shortage error for the cassette to the portable terminals in a case where absence of a sheet in the cassette is detected by the sensor;
      the network interface transmits recovery operation start information indicating that a recovery operation for the sheet shortage error has been started to the portable terminals in response to detecting that the cassette has been opened; and
      the network interface transmits error recovery information indicating that the error is recovered to the portable terminals in a case where presence of a sheet in the cassette has been detected by the sensor,
   wherein, in a case where the address is not registered in the memory as the target to which the error is notified, the controller does not perform the transmission processing of the error occurrence information, the recovery operation start information, and the error recovery information.

2. An image forming apparatus capable of communicating with portable terminals via a wireless network, comprising:
   a conveyance path for conveying a sheet;
   an image forming device that forms an image on a sheet conveyed by the conveyance path;
   a sensor that detects a sheet being conveyed by the conveyance path;
   a cover of the conveyance path that can be opened for recovering a sheet jam in the conveyance path;
   a network interface for communicating with the portable terminals via the wireless network;
   a memory for registering an address of at least one of the portable terminals as a target to which an error is notified; and
   a controller for controlling the network interface, in a case where the address is registered in the memory, such that:
      the network interface transmits error occurrence information indicating occurrence of a sheet jam error to the portable terminals in a case where occurrence of the sheet jam error is detected in the conveyance path by the sensor;
      the network interface transmits recovery operation start information indicating that a recovery operation for recovering the sheet jam error to the portable terminals in response to the cover of the conveyance path being opened; and
      the network interface transmits error recovery information indicating that the error is recovered to the portable terminals in a case where recovery from the sheet jam error occurred in the conveyance path is detected by the sensor,
   wherein, in a case where the address is not registered in the memory as the target to which the error is notified, the controller does not perform the transmission processing of the error occurrence information, the recovery operation start information and the error recovery information.

3. The image forming apparatus according to claim 2, further comprising a touch panel, wherein
   in a case where occurrence of the sheet jam is detected, the controller controls the touch panel such that the touch panel displays a screen indicating a jam eliminating procedure as well as controls the network interface such that the network interface transmits the error occurrence information indicating occurrence of the sheet jam error to the portable terminals.

* * * * *